350-392 SR
XR 2,983,824
SEARCH ROOM

May 9, 1961 R. W. WEEKS ET AL 2,983,824

ELECTRO-OPTICAL POINT SHUTTER

Filed May 6, 1955 4 Sheets-Sheet 1

INVENTORS
WESLEY E. DICKINSON
RICHARD W. WEEKS
BY Lippincott and Smith
ATTORNEYS

2983824
OR IN 250/207

ELECTRO-OPTICAL POINT SHUTTER

Filed May 6, 1955 4 Sheets-Sheet 2

INVENTOR.
WESLEY E. DICKINSON
RICHARD W. WEEKS
BY Lippincott and Smith
ATTORNEYS May 9, 1961 R. W. WEEKS ET AL 2,983,824

ELECTRO-OPTICAL POINT SHUTTER

Filed May 6, 1955 4 Sheets-Sheet 3

INVENTOR.
WESLEY E. DICKINSON
RICHARD W. WEEKS
BY Lippincott and Smith
ATTORNEYS May 9, 1961 R. W. WEEKS ET AL 2,983,824

ELECTRO-OPTICAL POINT SHUTTER

Filed May 6, 1955 4 Sheets-Sheet 4

INVENTOR.
WESLEY E. DICKINSON
RICHARD W. WEEKS
BY Lippincott and Smith
ATTORNEYS 2,983,824
Patented May 9, 1961

2,983,824

ELECTRO-OPTICAL POINT SHUTTER

Richard W. Weeks, Los Gatos, and Wesley E. Dickinson, San Jose, Calif., assignors to International Business Machines Corporation, New York, N.Y., a corporation of New York Filed May 6, 1955, Ser. No. 506,554

13 Claims. (Cl. 250—217)

This invention relates to high speed electro-optical point shutters for translating electric signals into optical images, to a novel point shutter or light valve having a birefringent piezoelectric crystal scanned by an electron beam to form optical images, to improved cathode ray image-display apparatus, and to novel television image-reproducing apparatus.

One serious difficulty in conventional cathode-ray tubes and kinescopes is their inherent low light output. This difficulty is especially acute in the case of projection television systems, in photographic printing apparatus for high-speed computers, and in other applications where very bright images are required. Various methods used to increase the light output of a conventional cathode ray tube lead to other difficulties—for example, if the accelerating voltage is increased, the deflection sensitivity is decreased and insulation problems become more severe. Accordingly, a principal object of this invention is to provide apparatus capable of producing more intense optical images than is practical with conventional cathode-ray tubes or kinescopes.

It has previously been appreciated that a light valve or point shutter, arranged to control the transmission of light produced by a constant high intensity source, would have many advantages in projection television and other apparatus for the formation and display of optical images. However, light valves have not been used extensively for such purposes, because of difficulties associated with the valves heretofore available. For example, some of the prior light valves do not act as point shutters, and hence require the use of cumbersome mechanical scanning apparatus; others have low response speeds, poor image resolution, or other defects. Accordingly, another object of this invention is to provide an improved high-speed light valve or point shutter capable of forming high quality optical images by purely electronic means.

Another object of the invention is to provide an image reproducer for color television receivers which will avoid problems of color registration heretofore encountered. Still another object is to provide an image reproducer for monochrome television receivers which is free from objectionable flicker. Other objects and advantages will appear as the description proceeds.

When a beam of plane-polarized light passes through certain substances, such as a properly oriented crystal of ammonium dihydrogen phosphate or potassium dihydrogen phosphate, in the presence of an electrical field parallel to the light beam, it is known that the polarization of the emergent light varies as a function of the electric field intensity. This effect is discussed, for example, in an article published in the "Journal of the Society of Motion Picture and Television Engineers," March 1953, vol. 60, page 205. Crystals having this property are called "electro-optical crystals" and they have previously been used to construct "light valves" in the following manner: a thin electro-optical crystal is sandwiched between two parallel transparent electrodes so that any voltage between the electrodes provides an electric field through the crystal. The crystal and electrode structure, or electro-optical element, is positioned in an optical path between a polarizer and an analyzer, with the electrodes and the large faces of the crystal perpendicular to the direction of light transmission. Preferably, the analyzer is "crossed" with respect to the principal plane of polarization of light emerging from the crystal when the voltage between the electrodes is zero, and very little light is transmitted by the valve under such conditions. When a voltage is applied between the electrodes, the polarization of light emerging from the crystal is altered, generally to an elliptical polarization, so that light is transmitted through the analyzer in an amount which is a function of the applied voltage. It will be noted that electro-optical crystal light valves, as the term is herein used, differ from the classical Kerr cell in that the electric field through the crystal is parallel to the direction of light transmission, while in the Kerr cell the electric field is perpendicular to the direction of light transmission.

As heretofore constructed and used, electro-optical crystal light valves have employed electrodes of relatively high electrical conductivity, so that the voltage between electrodes is substantially the same at all points and light is simultaneously transmitted in substantially equal amounts through all areas in a plane transverse to the light beam. Consequently, the prior art light valves of this type are "area" shutters which can control the degree and timing of light transmission but cannot of themselves produce optical images.

According to one aspect of the present invention, an electro-optical crystal light valve has one relatively high-conductivity electrode and one relatively low-conductivity electrode, and electric charges are distributed by electron beam means to selected points on the low-conductivity electrode in a pattern corresponding to the desired optical image. Different amounts of light are then transmitted through different areas in a transverse plane of the valve, and a "point" shutter is provided which can produce optical images in a manner hereinafter more fully explained.

The use of electron beams to control light valves of other types has previously been suggested. For example, in the article "Cathode-ray Control of Television Light Valves" by J. S. Donal, Jr., Proceedings of the Institute of Radio Engineers, vol. 31, May 1943, pp. 195–208. However, theoretical and practical difficulties have so far prevented extensive use of point shutters based on the previous suggestions, and, to the best of applicants' knowledge, prior efforts to overcome these difficulties have been unsuccessful. Applicants' new and unique combination of electron beam control with an electro-optical crystal to provide an optical point shutter solves problems which have heretofore remained unsolved through a long period of extensive work and experimentation by those skilled in the art, and it makes practicable the extensive use of light valves as point shutters in applications where such use has not previously been feasible.

Electrical images may be applied to and erased from the low conductivity electrode in various ways hereinafter described to provide different valve characteristics which are advantageous in particular applications. The duration of the image can be regulated to control the exposure time for a photographic film used to record the image. In a monochrome television system, the image duration can be made exactly equal to the interval between scanning frames, so that the screen is illuminated constantly and flicker is substantially eliminated. The color of light incident upon the shutter can be varied to provide a color television image reproducer in which there are no color registration problems. Numerous other possibilities for advantageous use of the new shutter will occur to those skilled in the art.

This invention will be better understood from the following description taken in connection with the accompanying drawings, and its scope will be pointed out in the appended claims. In the drawings:

Figure 1:
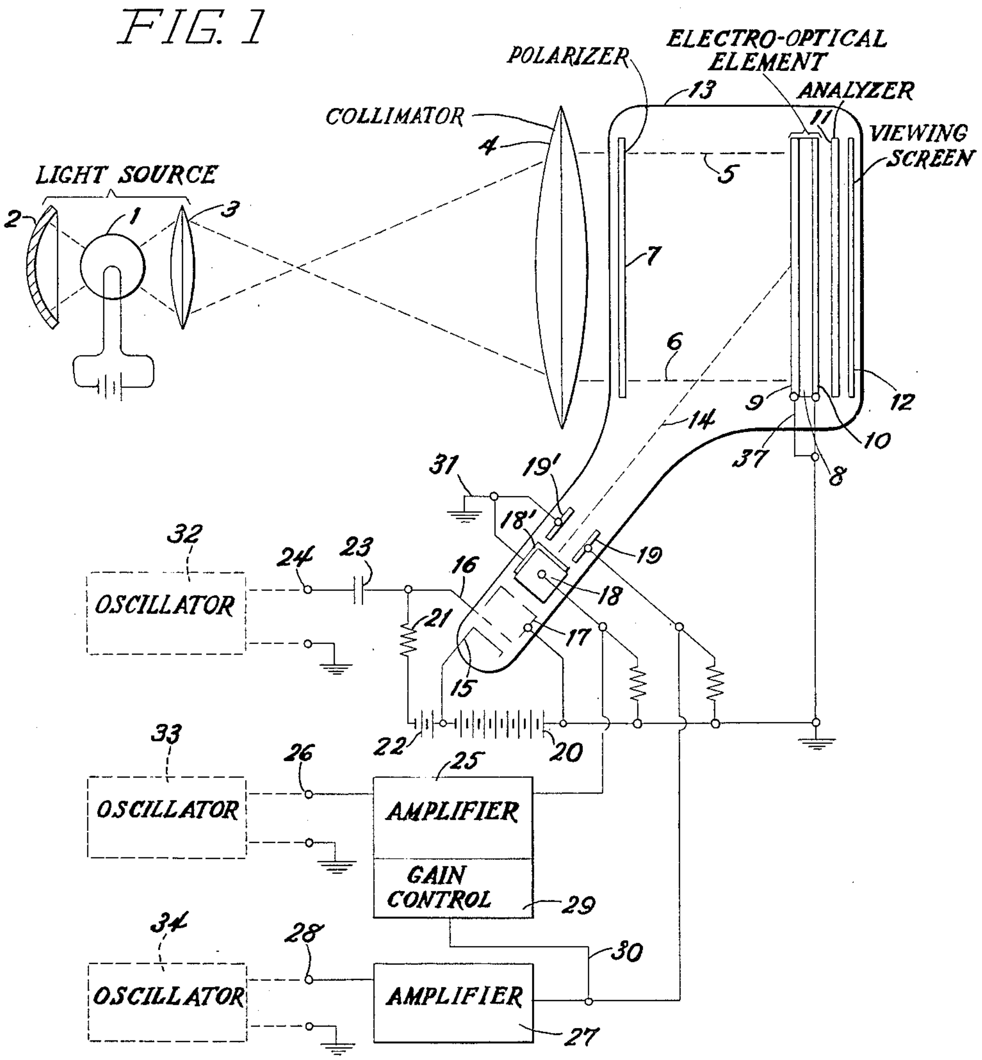
Fig. 1 is a schematic side elevation and simplified circuit diagram showing one embodiment of the invention, which may be used as a cathode ray oscilloscope.

Referring now to Fig. 1 of the drawing, a collimated beam of light is provided by a light source and collimator which may consist of a lamp 1, a reflector 2, a focusing lens 3, and a collimating lens 4. The collimated light beam passes successively through a polarizer, an electro-optical element, a polarized light analyzer, and a viewing screen, arranged in optical alinement. Outer rays of the collimated beam are represented in the drawing by broken lines 5 and 6. The light beam is plane polarized by the polarizer 7, which preferably is a dichroic disc of a material consisting of parallel crystals of herapathite embedded in a plastic matrix, generally called Polaroid. The electro-optical element consists of a thin, flat, wafer-shaped electro-optical crystal 8 sandwiched between two parallel transparent electrodes 9 and 10 so oriented that the electrodes and the two parallel large faces of the crystal are perpendicular to the plane-polarized, collimated light beam. Electro-optical crystal 8 preferably is a thin slice, about 50 mils thick, cut from a crystal of ammonium dihydrogen phosphate or potassium dihydrogen phosphate. Electrodes 9 and 10 may be thin, transparent metallic films coated directly on the large faces of crystal 8, or they may be thin plates of an electrically conductive glass such as Nesa glass. Electrode 10 has a relatively high electrical conductivity while electrode 9 has a relatively low electrical conductivity, for reasons which will become apparent as the description proceeds. In the case of thin film electrodes, for example, these differences in conductivity may be obtained by making electrode 10 substantially thicker than electrode 9. If the electrodes are films deposited by vacuum evaporation or some similar means, the thickness of the films can easily be controlled by well-known means to provide any desired degree of electrical conductivity.

Analyzer 11 is a dichroic disc which in practice may be identical to polarizer 7. Preferably the analyzer is oriented in the "crossed" position relative to the plane of polarization of light emerging from the electro-optical element when no voltage is present between electrodes 9 and 10, so that very little light is transmitted through analyzer 11 under such conditions. What ever light is transmitted through the analyzer strikes a viewing screen 12, which may be a thin plate of any light diffusing material such as frosted glass. In practice viewing screen 12 may be an etched or roughened face of an evacuated envelope 13 which, in the embodiment shown, encloses the polarizer, the electro-optical element and the analyzer. These elements may be supported within the envelope in any suitable manner. For example, the viewing screen may be cemented to or a part of the front face of the envelope, analyzer 11 may be cemented to the viewing screen, the electro-optical element may be cemented to the analyzer, and the polarizer 7 may be cemented to the rear face of the envelope.

An electron beam, indicated in the drawing by broken line 14, is provided by a conventional electron gun assembly consisting of a cathode 15, a control grid 16, and one or more accelerating and focusing electrodes 17. This gun assembly provides the electron beam 14 which is sharply focused to a point on electrode 9. Conventional deflecting means, such as electrostatic deflection plates 18 and 19, are provided for selectively deflecting beam 14 to a plurality of points on electrode 9. Electrodes 9 and 10 are electrically connected together, and are maintained at a positive potential relative to cathode 15 by any suitable means, such as the battery 20. Since the electron beam energy merely controls the light, rather than producing it, the accelerating voltage provided by the battery 20 can be relatively low compared to that needed for high-intensity conventional cathode ray tubes, and it may be in the order of 1000 volts for example. Because of the low accelerating voltage, and the consequent low velocity of electrons in beam 14, the deflection sensitivity of the apparatus is high: that is, beam 14 is deflected by a relatively large amount in response to small deflection voltages applied to deflection plates 18 and 19.

When electron beam 14 strikes any point on electrode 9, an electric charge is deposited at that point and an opposite charge is attracted to the corresponding point of electrode 10. In other words, a small area of electrode 9 and a corresponding small area of electrode 10 form a capacitance which is charged by the electron beam 14. These charges produce a voltage between the charged areas of the two electrodes, and thus provide an electric field through a small portion of crystal 8 so that polarized light passing through this part of the electro-optical element has its polarization altered, in consequence of which a substantial portion of the light passes through analyzer 11 and produces a bright spot on viewing screen 12. The direction of the electric field is perpendicular to electrodes 9 and 10, and is parallel to the collimated light beam. When beam 14 is deflected to strike a plurality of points on electrode 9 in rapid succession, charges are deposited at a plurality of selected points on electrode 9 and light is transmitted to corresponding points of viewing screen 12 to form an optical image.

Since electrodes 9 and 10 are electrically connected together, current flows between the two electrodes and tends to neutralize any deposited charges. As soon as the charge deposited on any point of electrode 9 is neutralized by this current flow, transmission of light through that small area of the shutter returns to its original value and the image on viewing screen 12 fades. If electrode 9 had high electrical conductivity, such neutralization would be practically instantaneous. However, because electrode 9 has low conductivity, any charge deposited on electrode 9 remains near the point of deposit for a brief period of time, then gradually leaks off through the relatively high resistance of the electrode. Thus the persistance of the image on screen 12 is a function of the conductivity of electrode 9. If the conductivity of electrode 9 is made very low, the image on screen 12 will persist for a relatively long time after electron beam 14 is cut off or deflected to another portion of electrode 9. Conversely, if the conductivity of electrode 9 is made somewhat greater, the image on screen 12 will persist for a shorter period of time. The conductivity of electrode 10 is made relatively high, by increasing the thickness of the electrode for example, so that charges on electrode 10 can redistribute themselves quickly to match the opposite charges deposited on electrode 9. It is generally desirable to make the conductivity of electrode 10 as large as is practicable without seriously reducing the transparency of the electrode to the light beam.

In Fig. 1 the electro-optical shutter is shown connected in an electrical circuit suitable for use as a simple oscilloscope. Control grid 16 is connected through a grid leak resistor 21 to a source of negative bias potential, such as battery 22. Grid 16 is also connected through a capacitor 23 to an input terminal 24 to which alternating voltage may be supplied for modulating the intensity of electron beam 14. Deflection plate 18 is connected through an amplifier 25 to an input terminal 26, to which voltage may be applied for deflecting electron beam 14 in a horizontal direction across electrode 9. Deflection plate 19 is connected through an amplifier 27 to an input terminal 28, to which voltage may be applied for deflecting electron beam 14 vertically across electrode 9. Because electron beam 14 is not perpendicular to electrode 9, the horizontal deflection sensitivity of the beam-deflecting structure varies as a function of the vertical deflection. In other words, when beam 14 is deflected toward the top of electrode 9, a given voltage applied to horizontal deflection plate 18 produces a larger horizontal deflection than the same voltage produces when beam 14 is deflected toward the bottom of electrode 9. This effect, generally known as "keystoning," can be corrected by electronic or optical means previously known in the art. For example, amplifier 25 may be a variable-gain amplifier having gain control provisions, indicated generally at 29, to which there is supplied a portion of the output from vertical amplifier 27 through a connection 30. Circuits of this type are well known in the art, and a detailed description of the circuit is considered unnecessary in the present application, since the specific means used for keystone correction is only incidental, and is not material to the present invention. According to previously-known principles of such correction circuits, gain control 29 automatically adjusts the gain of amplifier 25 in accordance with the vertical deflection voltage applied to electrode 19 so that a given voltage applied to horizontal deflection input terminal 26 produces the same amount of horizontal deflection of beam 14 across electrode 9 regardless of the vertical position of the beam. In Fig. 1, it should be understood that deflection plates 18 and 19 are each one of a pair of deflection plates, there being a plate 19' directly opposite plate 19, and a plate 18' directly opposite plate 18. As shown in the drawing, the second deflection plate of each pair may be connected to ground at 31. Alternatively, opposite deflection voltages are applied to the opposite plates of each pair by a push-pull amplifier, in the well known and customary manner for cathode-ray devices using electrostatic deflection.

Figure 2:
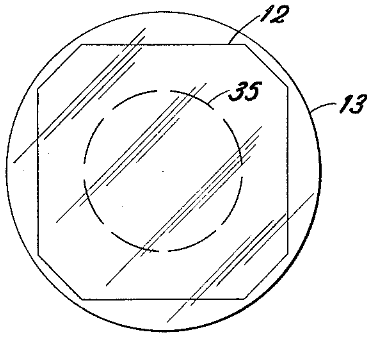
Fig. 2 is a front elevation showing an image formed on the viewing screen of the Fig. 1 apparatus.

The oscilloscope shown in Fig. 1 may be used for any of various purposes for which conventional cathode ray oscilloscopes are usually employed. For example, the phase relations of voltages produced by three oscillators 32, 33 and 34 may be investigated by means of Lissajous figures. An example of the optical image which may be formed in this manner is illustrated by the broken-line curve 35, Fig. 2. Oscillators 33 and 34 are connected to the horizontal deflection input terminal 26 and the vertical deflection input terminal 28, respectively. Assume that these two oscillators produce voltages of equal amplitude and frequency which differ by 90° in phase. As is well known, such deflection voltages cause electron beam 14 to continuously scan a circular path on electrode 9, so that image 35 seen on viewing screen 12 has a generally circular shape. Now assume that oscillator 32 provides a voltage to intensity-modulation terminal 24 which has a frequency exactly eight times as great as the operating frequency of oscillators 33 and 34. When the voltage supplied to terminal 24 is positive, the intensity of beam 14 is increased so that more charge is deposited at each of the scanned points on electrode 9, and a brighter image is formed on screen 12. When the instantaneous voltage at terminal 24 is negative, the intensity of beam 14 is reduced, so that less charge is deposited at the scanned points on electrode 9 and the brightness of the image seen on viewing screen 12 is diminished. If the bias voltage provided by battery 22 is near the cutoff voltage of the electron gun, beam 14 will be completely cut off during each negative half cycle of voltage supplied to terminal 24 by oscillator 32, and since this voltage has a frequency eight times as great as the operating frequency of oscillators 33 and 34, beam 14 will be cut off eight times during each circular scanning cycle. In consequence, image 35 is generally circular in shape, but consists of eight bright portions and eight dark portions, as shown in Fig. 2. In addition to its use in oscillographic apparatus, the new electro-optical shutter can be used with any apparatus which provides appropriate deflection voltages or intensity modulation voltages, or both, to form images for radar displays, television reception, electro-photographic printing, and other purposes.

Figure 3:
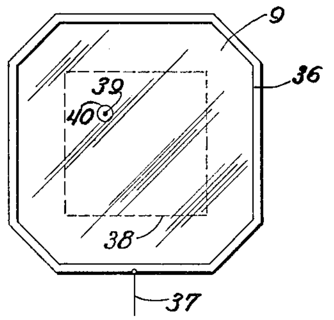
Fig. 3 is a rear elevation of the low conductivity electrode.

For a more detailed consideration of the mechanism whereby electric images are formed on low-conductivity electrode 9, reference is now made to Fig. 3 which shows a rear elevation of this electrode. As hereinbefore explained, electrode 9 may be a very thin metallic film evaporated or otherwise deposited on the rear face of crystal 8, or supported in any other manner adjacent to the crystal face. It may be disc-shaped or rectangular, but in the preferred form shown it is substantially square, with the corners cut off to facilitate its insertion in a relatively small cylindrical envelope. A highly conductive strip 36 extends around the periphery of electrode 9, as shown, and strip 36 is connected to the electrical circuit through lead 37. Strip 36 may be formed by depositing an extra thickness of metal around the periphery, or in any other suitable manner. The deflection of electron beam 14 preferably is limited to a central area of electrode 9, such as the area enclosed within a broken line square or rectangle 38.

Now assume that electron beam 14 strikes point 39 of electrode 9, and deposits an electric charge at point 39. As hereinbefore explained, this provides a voltage between point 39 and a corresponding point of electrode 10, and thus permits light to pass through the shutter along the line passing through point 39 to the viewing screen 12. Consequently, an illuminated spot is formed at a corresponding point on screen 12, the brightness of which is a function of the amount of charge deposited at point 39. The charge deposited at point 39 immediately begins to spread outward in all directions toward the conductive strip 36, but the speed at which it can do so is limited by the low conductivity of electrode 9. After a brief interval, the charge will have spread to cover an area represented by circle 40, and the spot seen on viewing screen 12 will have increased in size by a corresponding amount. However, the same amount of charge that was originally concentrated at the small point 39 is now spread over the relatively large area of circle 40, so that the charge intensity at any point within circle 40 is very much less than the charge intensity at point 39 when the charge was first deposited. Therefore, the spot on screen 12 rapidly diminishes in brightness as it increases in area, and quickly becomes imperceptible. Eventually all of the charge reaches conductive strip 36 and is carried away through the lead 37. An observer watching viewing screen 12 sees only a brief flash of light at point 39, the intensity of which is a function of the amount of charge deposited at that point by the electron beam and the duration of which is a function of the electrical resistance between point 39 and strip 36. When many points of electrode 9 receive charges in rapid succession from the electron beam, the migration pattern of the electric charges becomes more complex, but the visual results are qualitatively the same: that is, a flash of light is seen at each point on viewing screen 12 which corresponds to a point where charge was deposited on electrode 9, and an optical image appears on the viewing screen. By proper selection of the electrode conductivity, the duration of each light flash may be made a large or a small fraction of a scanning cycle.

Figure 4:
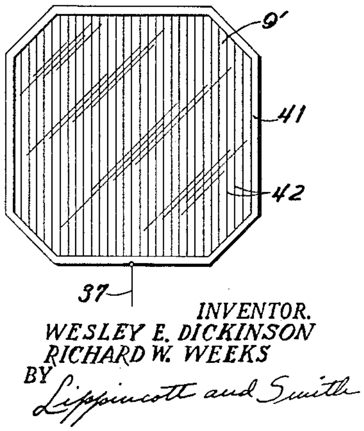
Fig. 4 is a rear elevation showing a modification of the low conductivity electrode.

An alternative form of the low-conductivity electrode is shown in Fig. 4. Electrode 9', which may be used in place of electrode 9, preferably is a low-conductivity, thin metallic film with a high-conductivity strip 41 around its periphery, as shown. In addition, a high-conductivity, fine, closely spaced grid 42 is superimposed on the low conductivity film. Grid 42 may be formed, for example, by vacuum depositing an additional thickness of metal through a suitable mask, or by other means. Any charge which reaches the high conductivity grid, from the low conductivity film or directly from electron beam 14, is quickly carried away through lead 37. Charges deposited on the low-conductivity film between the grid lines acts as hereinbefore explained to permit the transmission of light to a spot on the viewing screen. The charge, however, migrates only until it reaches the nearest line of the high conductivity grid, whereupon it is carried off through lead 37. In this embodiment, the resolution of the optical image is limited by the spacing between the lines of grid 42. For example, if an image having 400 lines resolution is desired, grid 42 having at least 400 lines must be employed. Also, the grid size must be small enough that the shadow of the grid, which will appear on the viewing screen, is not objectionable. Furthermore, in comparison with electrode 9, Fig. 3, somewhat larger charges must be deposited on electrode 9', Fig. 4, for an image of the same brightness, since part of the charge deposited on electrode 9' falls upon the grid 42 and is conducted away immediately, and part of the charge which falls between the grid lines is neutralized by opposing charges on the grid lines, so that only a small fraction of the charge deposited by the electron beam produces a voltage through the crystal to permit the transmission of light. However, these difficulties are not too serious, since adequate amounts of charge can be supplied by electron beams of convenient size.

With either form of low-conductivity electrode, it should be noted that the electric field which controls the transmission of light through the shutter is produced by a voltage between corresponding points of the low-conductivity and the high-conductivity electrode. Since these electrodes are parallel and relatively close together, the electric field is substantially perpendicular to the two electrodes and to the large faces of electro-optical crystal 8, and is parallel to the plane-polarized collimated light beam passing through the crystal. This is true irrespective of the angle at which electron beam 14 strikes electrode 9. The electric field between the electrodes is parallel with the light beam, although the electron beam generally is not parallel to the light beam.

For a given film conductivity, the electrode structure shown in Fig. 4 provides an image which persists for a much shorter time than does the electrode structure shown in Fig. 3, since the deposited charges migrate a much shorter distance before reaching a high-conductivity portion of the electrode. With the electrode structure shown in Fig. 4, the image persistance is substantially the same in all parts of the electrode inside the peripheral strip 41, and the entire electrode may be scanned by the electron beam to provide an optical image substantially as large as the entire electrode area.

With the electrode structure shown in Fig. 3, the electrical resistance from the edges of the electrode to strip 36 is less than that from the center of the electrode since charges deposited near the edges have a much shorter distance to migrate. Consequently, with the electrode structure shown in Fig. 3, it is preferable that the electron beam scan only a central portion of the electrode—that portion within the broken-line square 38, for example, and accordingly the optical image formed is somewhat smaller than the electrode area.

However, in some cases the entire area of electrode 9 may be scanned, and when this is done an image may be formed which is brightest in its central portions and which diminishes in brightness toward the edges of the image. Thus the central portions of the image will be emphasized, and the peripheral portions of the image will provide a background of reduced brightness. This effect may be desirable in some applications.

Figure 5:
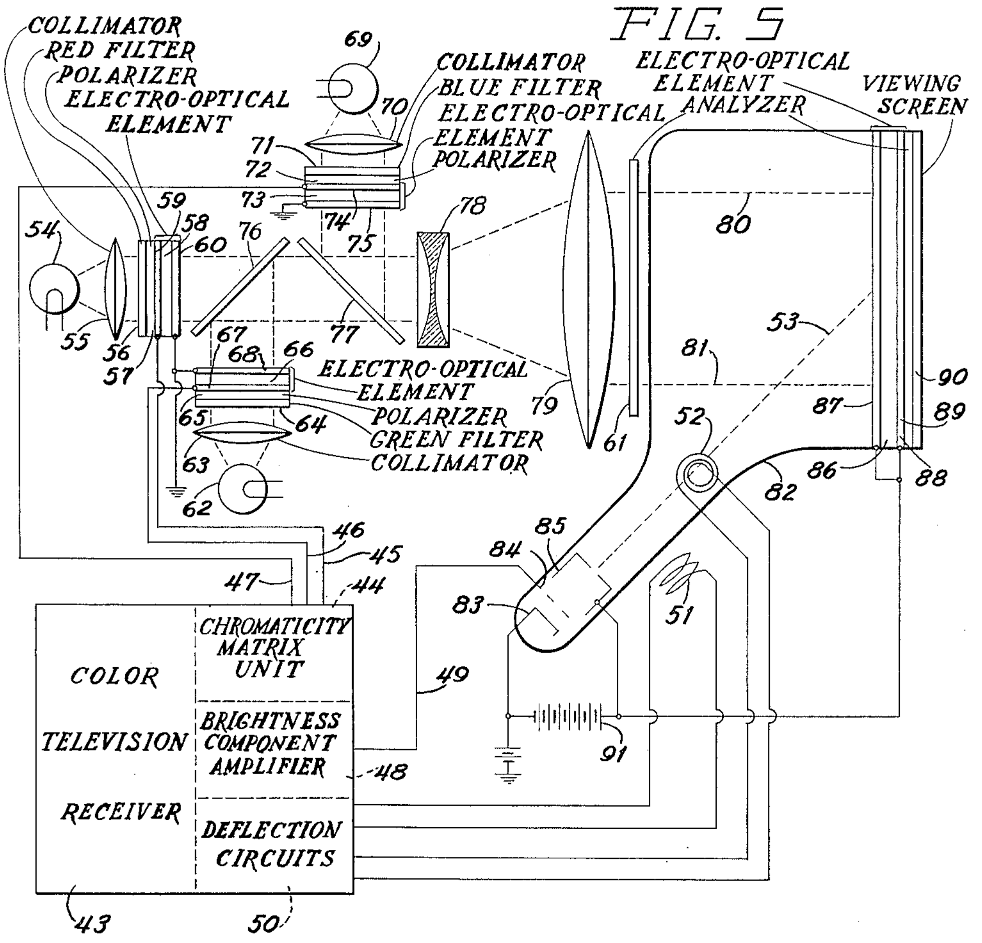
Fig. 5 is a schematic side elevation and simplified circuit diagram of a color television receiver embodying principles of the invention.

Fig. 5 illustrates an embodiment of the invention in a color television receiver which avoids color registration problems encountered with prior color reproducers. In Fig. 5, box 43 represents conventional receiver circuits for a color television receiver using the NTSC color system adopted by the National Television Systems Committee, general principles of which are described in the book, "Television Engineering," by Donald G. Fink, McGraw-Hill Book Co., 1952, pp. 544–549, and which is well known to persons skilled in the art. Since the present invention concerns only the color reproducer portion of the receiver, it is not considered necessary to describe other portions of the receiver circuit in detail in this application. As is well known, the receiver includes a chromaticity matrix unit 44 which supplies to the color reproducer through leads 45, 46 and 47 electric signals respectively representing the instantaneous red, green and blue color values of the image to be reproduced, a brightness component amplifier 48 which supplies to the color reproducer through lead 49 an electric signal representing the instantaneous brightness of the image to be reproduced, and deflection circuits 50 which supply to magnetic deflection coils 51 and 52 saw-tooth waveform currents for deflecting electron beam 53 over a conventional television scanning raster.

According to the present invention, the color reproducer comprises means providing a collimated beam of light which varies in color according to changes in the chromaticity signals provided through leads 45, 46 and 47, and an electro-optical point shutter which transmits a part of this light to a viewing screen in a selective point-by-point manner controlled by the deflection circuits and by the brightness signals transmitted through lead 49.

In the embodiment illustrated, a lamp 54 and a collimator 55 provide a collimated light beam through a red color filter 56, a polarizer 57, and an electro-optical element comprising an electro-optical crystal 58 sandwiched between two high-conductivity transparent electrodes 59 and 60. The emergent light then passes through an optical system, hereinafter more fully described, and a polarized light analyzer 61. Since both of the electrodes 59 and 60 have relatively high conductivities, this apparatus acts as an area shutter for simultaneously modulating the intensity of all parts of the light beam. Electrode 59 is connected to lead 45, so that the red chromaticity signal supplied through lead 45 by the receiver circuits control the amount of red light transmitted by analyzer 61. Another light source 62 and collimator 63 provide a beam of collimated light through a green color filter 64, a polarizer 65 and an electro-optical element comprising an electro-optical crystal 66 sandwiched between two high-conductivity transparent electrodes 67 and 68. Electrode 67 is connected to lead 46, and thus receives the green chromaticity signal from the television receiver circuit. Another light source 69 and a collimator 70 provide a beam of collimated light through a blue color filter 71, a polarizer 72 and an electro-optical element comprising an electro-optical crystal 73 sandwiched between two high-conductivity transparent electrodes 74 and 75. Electrode 74 is connected to lead 47, and receives blue chromaticity signals from the receiver circuits. Upon emerging from the respective electro-optical elements, the red, green, and blue light beams are combined by a pair of half-silvered mirrors 76 and 77, or by prisms, dichroic mirrors, or other means, and then passed through lenses 78 and 79 to the analyzer 61. Thus analyzer 61 acts as the analyzer for all three beams, but of course it would be possible, if desired, to use separate analyzers for each beam. The chief purpose of lenses 78 and 79 is to increase the transverse area of the beam to the desired image size, so that the chromaticity-controlled electro-optical area shutters can be relatively small in size. Upon leaving lens 79, the beam is again collimated as is indicated in the drawing by broken lines 80 and 81, which represent the outer rays of the beam. As the voltages supplied through leads 45, 46 and 47 vary relative to one another, the relative amounts of red, green and blue light transmitted by the chromaticity area shutters likewise vary, and the color of the light beam emerging from analyzer 61 has the desired chromaticity of the image element being transmitted at that instant.

Since the light emerging from analyzer 61 is plane-polarized by the analyzer, analyzer 61 can also act as the polarizer for an electro-optical point shutter of the type hereinbefore described. In the embodiment here illustrated, this point shutter consists of an evacuated envelope 82; an electron gun structure comprising a cathode 83, a control grid 84, and one or more accelerating electrode 85; an electro-optical element comprising an electro-optical crystal 86, a low conductivity electrode 87, and a high conductivity electrode 88; an analyzer 89; and a viewing screen 90. Electrodes 87 and 88 are electrically connected together and are maintained at a positive potential relative to the cathode 83 by suitable means such as battery 91. The electron gun 83, 84, 85, provides the electron beam 53 which is focused to a point on electrode 87 and which is deflected by magnetic deflection coils 51 and 52 to a plurality of points, successively, on electrode 87 in a conventional scanning raster. In this embodiment, crystal 86, electrodes 87 and 88, analyzer 89, and viewing screen 90 are sealed into the front end of evacuated envelope 82.

The electrical conductivity of electrode 87, although preferably lower than the conductivity of electrode 88, is sufficiently high that the charge deposited at any point on electrode 87 is conducted away almost immediately after electron beam 53 moves to another point, so that light is transmitted to viewing screen 90 at substantially only one point at a time. The brightness of the image at any point on the viewing screen is controlled by the potential of control grid 84 at the instant when electron beam 53 strikes a corresponding point on electrode 87, and this in turn is controlled by the brightness signal supplied through lead 49 by brightness amplifier 48 of the receiver circuits. The color of the image at any point is the color of light transmitted through analyzer 61 at the instant when that point on the viewing screen is illuminated, and this in turn is controlled by the chromaticity signals supplied through leads 45, 46 and 47 by chromaticity matrix unit 44 of the receiver circuits. As beam 53 scans electrode 87 to illuminate successive points on screen 90 to varying degrees of brightness, the color of light transmitted through analyzer 61 varies from instant to instant, so that a faithful color image is formed on the viewing screen. Preferably, the amount of light transmitted through analyzer 61 to the electro-optical element of the point shutter remains substantially constant, but changes in color value in response to the chromaticity signals, so that the brightness of the image depends solely upon the brightness signals supplied through lead 49. Accordingly, a color reproducer is provided which fully meets the requirements of the NTSC color system, and at the same time avoids color registration problems encountered with color reproducers heretofore used.

Figure 6:
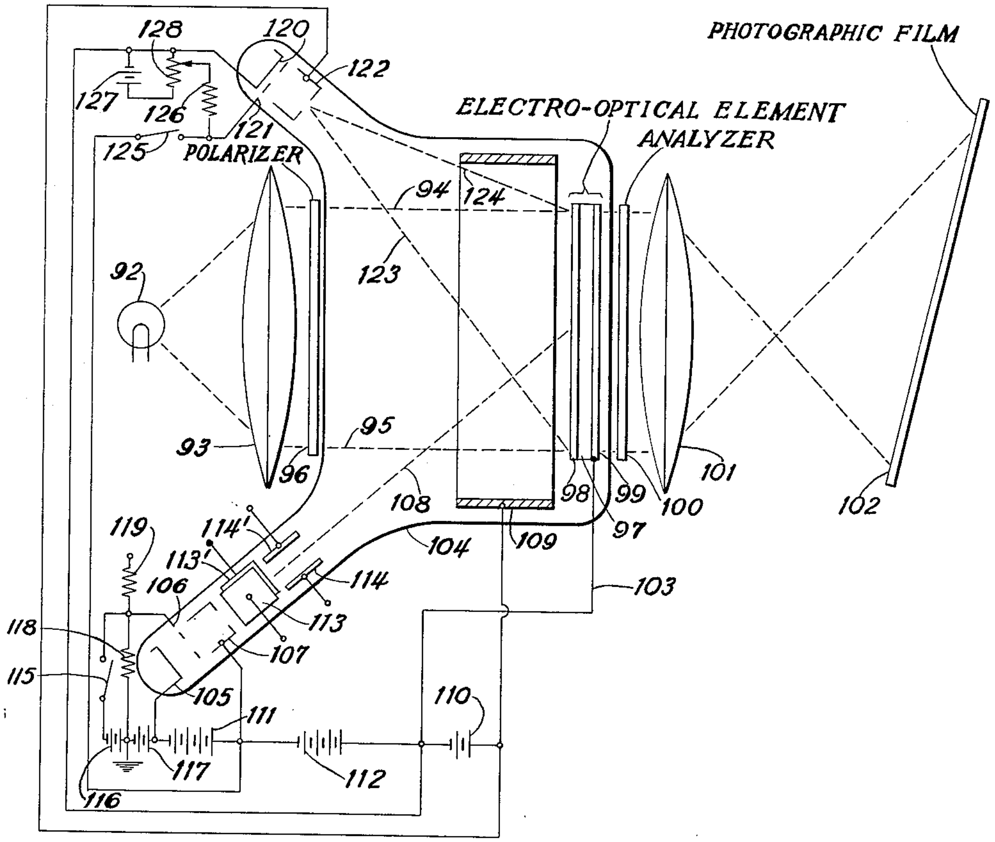
Fig. 6 is a schematic side elevation and simplified circuit diagram showing another embodiment of the invention which may be used to form and photograph optical images.

Fig. 6 illustrates another embodiment of the invention which is especially useful in forming images for photographic reproduction; and particularly in electro-photographic printing apparatus employed, for example, in a read-out unit of a high-speed digital computer. Referring now to Fig. 6, a light source 92 and a collimator 93 provide a collimated light beam the outer rays of which are indicated in the drawing by broken lines 94 and 95. The collimated light beam passes through a polarizer 96, which plane polarizes the beam, through an electro-optical element consisting of an electro-optical crystal 97 sandwiched between two transparent electrodes 98 and 99, and through a polarized light analyzer 100. Light rays emerging from the analyzer are directed by projection lens 101 on to a photographic film 102. In this embodiment, electrode 99 is a high-conductivity electrode, preferably a transparent metallic film, which is connected to the electrical circuit through a lead 103. Electrode 98 is an insulating material having no direct connection to the electrical circuit, and the charges thereon are determined by a balance between deposited primary electrons and emitted secondary electrons in a manner hereinafter more fully explained. Crystal 97 is a good electrical insulator, and leakage current through the crystal between electrodes 98 and 99 is generally negligible.

The evacuated envelope 104 contains two electron guns providing two electron beams having different characteristics. One electron gun consists of a cathode 105, a control grid 106, and one or more accelerating electrodes 107. This gun provides a sharply-focused electron beam 108 which strikes electrode 98 with sufficient velocity to release a large number of secondary electrons. The secondary electrons are removed by a collector electrode 109 which is maintained at a potential positive with respect to electrode 99 by suitable means such as battery 110. Batteries 111 and 112 maintain cathode 105 at a sufficiently negative potential with respect to electrodes 98 and 99 so that beam 108 has sufficient velocity to cause a secondary emission ratio greater than unity at electrode 98. Consequently, when beam 108 strikes any point on electrode 98, that point becomes positive with respect to electrode 99, and consequently a voltage through the crystal 97 is produced at that point which permits light to pass through a small area of the shutter to projection lens 101, which projects the light beam onto photographic film 102. By means of suitable voltages supplied to electrostatic deflection plates 113, 113', 114 and 114', beam 108 can be deflected successively to a plurality of points on electrode 98 to form an electrical image on the electrode, which permits light to pass through the shutter and form an optical image on photographic film 102. Thus beam 108 is the "writing" beam. Since electrode 98 is a good insulator, the deposited charges tend to remain in place for a relatively long time so that the image generally persists until it is erased by means hereinafter described.

Control grid 106 is connected through a switch 115 to a source of negative potential, such as batteries 116 and 117, so that when switch 115 is closed control grid 106 is maintained sufficiently negative with respect to cathode 105 that electron beam 108 is cut off.

When switch 115 is opened, control grid 106 is connected to a less negative potential through resistor 118, which controls the average intensity of electron beam 108. The intensity of beam 108 can be modulated, if desired, by modulating voltage supplied to control grid 106 through resistor 119 from any suitable modulation source. Whenever it is desired that an electrical image be formed on electrode 98 to form an optical image on photographic film 102, switch 115 is opened while suitable deflecting voltages are applied to the electrostatic deflection electrodes, with or without a modulating voltage applied to the control grid, so that electron beam 108 "writes" the desired electrical image on electrode 98. When the writing is completed, switch 115 is closed. In practice, switch 115 may be an electronic switch capable of extremely rapid operation, and the deflecting and modulating voltages may be supplied by any suitable circuits of the apparatus with which this image reproducer is used.

A second electron gun consists of a cathode 120, a control grid 121, and one or more accelerating electrodes 122. This second electron gun provides a low-velocity, defocused, cone-shaped electron beam, the outer limits of which are indicated in the drawing by broken lines 123 and 124. This low-velocity, defocused beam supplies electrons to the entire surface of electrode 98 at velocities too low to produce substantial secondary emission, so that this beam tends to make electrode 98 more negative. Cathode 120 is connected to lead 103, and thus is maintained at the same electrical potential as electrode 99. Control grid 121 is connected through a switch 125 to a relatively negative source of potential such that the low velocity beam is cut off when switch 125 is closed. When switch 125 is open, the potential of control grid 121 is controlled by its connection through a resistor 126 to an adjustable negative-bias voltage supply such as battery 127 and potentiometer 128. When switch 125 is open, low velocity electrons travel toward electrode 98. The areas of electrode 98 which have been left positive with respect to electrode 99 by writing beam 108 attract the low velocity electrons so that the low velocity beam neutralizes the positive charges. Areas which are not positive with respect to electrode 99 tend to repel the low velocity electrons, and therefore do not accumulate substantial amounts of negative charge. The repelled electrons are attracted to collector 109, which is at a more positive potential, and are thus removed. Consequently the low velocity electron beam tends to restore the potential at all points on electrode 98 to equality with the potential of electrode 99, so that the low-velocity beam is an "erasing" beam which erases the electrical image on electrode 98 and thereby erases the optical image on film 102.

Figure 7:
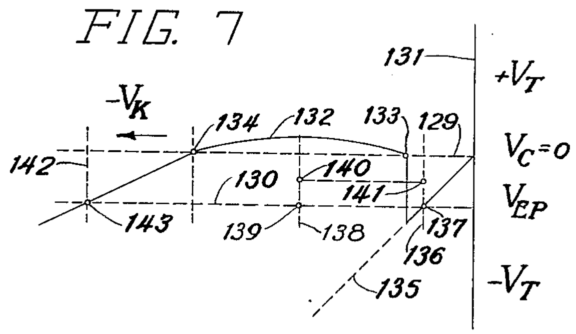
Fig. 7 is a diagram showing the equilibrium electric potential of a floating electrode bombarded by primary electrons and emitting secondary electrons.

The action of the writing and erasing beams can be better understood by reference to Fig. 7, which is a diagram showing the equilibrium potential of a floating electrode subjected to electron bombardment and emitting secondary electrons. In this diagram, the potential of collector electrode 109, designated $V_c$, is taken as the reference or zero potential. This potential is represented in Fig. 7 by horizontal broken line 129. The potential of electrode 99, called the backplate potential and designated $V_{BP}$, is represented in Fig. 7 by the horizontal broken line 130. The potential of the cathode of the beam under consideration, either cathode 105 or cathode 120 depending upon which beam is being considered, is represented by horizontal distance to the left from vertical line 131. The equilibrium potential of the floating electrode 98 is represented by the solid-line curve 132. Curve 132 crosses line 129 at two points, designated 133 and 134, which are commonly called the first cross-over point and the second cross-over point respectively. These cross-over points represent the cathode voltages, and hence the electron velocities, at which the secondary emission ratio is unity. At intermediate potentials, between points 133 and 134 the number of secondary electrons emitted tends to exceed the number of primary electrons, so that the equilibrium potential 132 is slightly positive with respect to the collector potential. The amount of this positive potential is limited to a small value by the fact that the secondary electrons tend to fall back upon electrode 98 when it becomes positive with respect to collector 109. At low and at high cathode potentials, and hence at low and high electron velocities, smaller in magnitude than point 133 or larger in magnitude than point 134, respectively, the secondary emission ratio is less than unity, and the equilibrium potential of electrode 98 is negative with respect to collector electrode 109. At points lying along the 45 degree line 135, the potential of electrode 98 is equal to the cathode potential.

The potential of the low-velocity beam cathode 120 is equal to the potential of back-plate electrode 99, and is represented in Fig. 7 by vertical line 136. Accordingly, the low-velocity beam acts to bring floating electrode 98 to the potential represented at point 137, which is equal to the back-plate potential of electrode 99 as hereinbefore explained. Now assume that the potential of cathode 105 is represented in Fig. 7 by vertical line 138. When beam 108 first strikes a point on electrode 98, that point is at the back-plate potential, which may be represented in relation to beam 108 by point 139 of Fig. 7. Under bombardment by bean 108, secondary electrons are emitted by the bombarded portion of electrode 98 and the potential of the bombarded portion moves in a positive direction toward the equilibrium potential, line 132. During a given time interval the potential of the bombarded spot may move to point 140, which is positive with respect to the potential of electrode 99. It will be understood that in this embodiment the potential of cathode 105 relative to the collector potential and the back-plate potential is constant, and therefore the electrons in beam 108 always have substantially the same velocity, but that the intensity of the beam, or the number of electrons striking electrode 98 within a given period of time, can be varied by the modulating potential applied to control grid 106. If beam 108 strikes the same spot for a longer period of time, or if the intensity of the beam is increased so that more electrons strike the same spot during the same period of time, the potential of the bombarded spot will be shifted by a greater amount in the positive direction toward curve 132 and a brighter spot will be formed in the optical image. Now assume that beam 108 is cut off when the potential of the bombarded spot reaches point 140. As long as both beams are cut off, the electrode potentials remain substantially the same for relatively long periods, since electrode 98 is a good insulator. Now assume that the low-velocity electron beam is cut on by opening switch 125. The previously bombarded spot is now at a potential with respect to the low-velocity beam represented in Fig. 7 by point 141. Electrons from the low-velocity beam are attracted to this positive point, so that its potential is shifted in a negative direction to point 137.

The curves shown in Fig. 7 are applicable to insulating materials in general, although the cross-over potentials will of course vary for different substances. Accordingly, a wide variety of insulating materials can be used in constructing electrode 98. A thin sheet of mica makes a very good electrode for this purpose. In the case of mica, the first cross-over point 133 occurs at a potential in the order of 200 volts and the second cross-over potential 134 occurs at about 3000 volts. Accordingly, using a mica sheet for electrode 98, the potential of cathode 120 may advantageously be 100 to 150 volts negative with respect to the potential of collector 109, and the potential of cathode 105 may be about 2000 volts negative with respect to collector electrode 109. When other materials are used for electrode 98, it may be desirable to change the values of the cathode potentials. In some cases, an exposed face of crystal 97 may be a satisfactory floating electrode, in which the electrode 98 becomes merely the back face of crystal 97. Accordingly, it should be understood that references herein made to a low-conductivity electrode include the alternative when this electrode is actually one face of the electro-optical crystal.

It will be appreciated that variations are possible in the manner of constructing the apparatus shown in Fig. 6, and in particular that various circuit modifications may be made to change the electrode potentials without altering the basic principles involved. For example, cathode 120 could be operated at a high negative potential represented in Fig. 7 by vertical line 142. A beam of electrons provided by a cathode operated at such a potential would shift the potential of electrode 98 to point 143 of Fig. 7, which is also equal to the back-plate potential and thus would provide just as effective an erasing action as is provided by the low velocity beam having a cathode at the potential represented by vertical line 136. As another alternative, the back-plate 99 could be operated at the same potential as collector potential 109, in which case the erasing cathode could be operated at the potential represented at vertical line 138 and the writing cathode could be operated either at the potential represented by vertical line 136 or at the potential represented by vertical line 142. Furthermore, vertical line 136 may be shifted to other points within the regions to the right of point 133, vertical line 138 may be shifted to other points within the region between points 133 and points 134, and vertical line 142 may be shifted to other points within the region to the left of point 134, making appropriate adjustments, if necessary, according to the principles herein explained, in the potential of back-plate 99.

With the circuit shown in Fig. 6, the electrical image formed by electron beam 108 on electrode 98 produces a luminous optical image on a dark background. If back-plate electrode 99 is connected to collector electrode 109, without changing the cathode potentials, the optical image produced would be a dark image on an illuminated background—that is, the optical image would be an optical negative of the electrical image. This may be desirable in some applications. The collector electrode 109 preferably is a metallic cylinder as shown, which may be a metallic coating on the inner surface of envelope 104, or may be a metallic side wall of the envelope. Alternatively, the collector electrode may be a fine-mesh grid positioned just behind electrode 98, or it may be a combination of a grid and a cylinder.

Since light passing through the point shutter is collimated, no focusing of the emergent beam is required to form an optical image. Consequently, if desired, the projection lens 101 may be omitted and an image may be formed directly upon film 102 by the collimated beam. Use of projection lens 101, however, permits magnification or reduction of the image size, as desired. Lens 101 does not focus the beam in the usual sense, but merely changes the direction of parallel rays which emerge from analyzer 100. Consequently, no focusing adjustment of lens 101 is required. If a smaller image is desired, photographic film 102 is moved closer to lens 101, and if a larger image is desired, photographic film 102 is moved farther away from lens 101, and no other adjustment is necessary. Furthermore, by tilting film 102 to a non-perpendicular angle with the axis of the beam, as shown in Fig. 6, optical compensation is providing for the keystoning effect provided by the non-perpendicular relation of beam 108 to electrode 98, and the need for electronic keystone correction is eliminated.

According to one method of operating the apparatus shown in Fig. 6, switches 115 and 125 are normally closed, and both of the electron beams are cut off. When switch 115 is opened, the intermediate velocity electron beam 108 is cut on, and this beam is deflected to selected points on electrode 98 to form an electrical image, which, in turn, produces an optical image on photographic film 102. As soon as the image has been formed switch 115 is closed and beam 108 is again cut off. As hereinbefore explained, the images persist while the beams are cut off, and the exposure of film 102 continues for a length of time required to properly expose the photographic film. When the film has been properly exposed, switch 125 is opened and electrode 98 is then flooded with low-velocity electrons which erase the electrical image and terminate the exposure of film 102. By using an electronic switch which opens and closes switches 115 and 125 in timed sequence, the exposure time of film 102 can be accurately controlled to the best value for proper exposure of the film. According to another method of operating the apparatus shown in Fig. 6, switch 125 remains open at all times, so that the surface of electrode 98 is continuously flooded with low-velocity electrons. Because the low velocity beam is diffused over the entire area of electrode 98, the number of low-velocity electrons reaching any point on electrode 98 during a short time interval is relatively small. On the other hand, the intermediate velocity electron beam 108 is focused to a point on electrode 98, and provides a relatively large number of intermediate velocity electrons at that point. Consequently, the action of beam 108 predominates at the point to which it is focused, so that "writing" or electrical image formation occurs at that point, while erasing of the image occurs simultaneously at all other points. When beam 108 is deflected to another point, the length of time required for the low-velocity electrons to neutralize the previously deposited positive charge, and thus the persistence of the optical image, is a function of the intensity, or the electron density, of the low-velocity beam, and this can be regulated by adjusting potentiometer 128 which controls the negative bias potential applied to control grid 121. In practice potentiometer 128 is adjusted for an image persistence which provides just the right exposure time for a photographic film 102.

According to another alternative, the low velocity or erasing beam may also be made a focused electron beam, and deflecting electrodes may be added to deflect the erasing beam selectively to a plurality of points on electrode 98. In this way the electrical image formed on electrode 98 by beam 108 can be erased in a selective point-by-point manner. For example, beam 108 might be deflected in a television type scanning raster over the surface of electrode 98, and the low velocity beam can be deflected over a similar scanning raster covering the same electrode area, with the scanning pattern of the erasing beam delayed in time with respect to the scanning pattern of the writing beam, so that each point of electrode 98 is first scanned by the writing beam and then, after a predetermined time interval, the same point is scanned by the erasing beam. In this alternative, the persistence of the image, and hence the exposure time of photographic film 102, is determined by the time interval between the scanning of a point by the writing beam and scanning the same point by the erasing beam.

According to another alternative, the same beam, beam 108 for example, can be used for both writing and erasing if provision is made for shifting the potential of the electron gun cathode with respect to the potentials of collector electrode 109 and back-plate electrode 99. For example, switching means may be provided whereby a single electron gun is connected in the manner of electron gun 105, 106, 107 for writing, and is connected in the manner of electron gun 120, 121, 122 for erasing.

Figure 8:
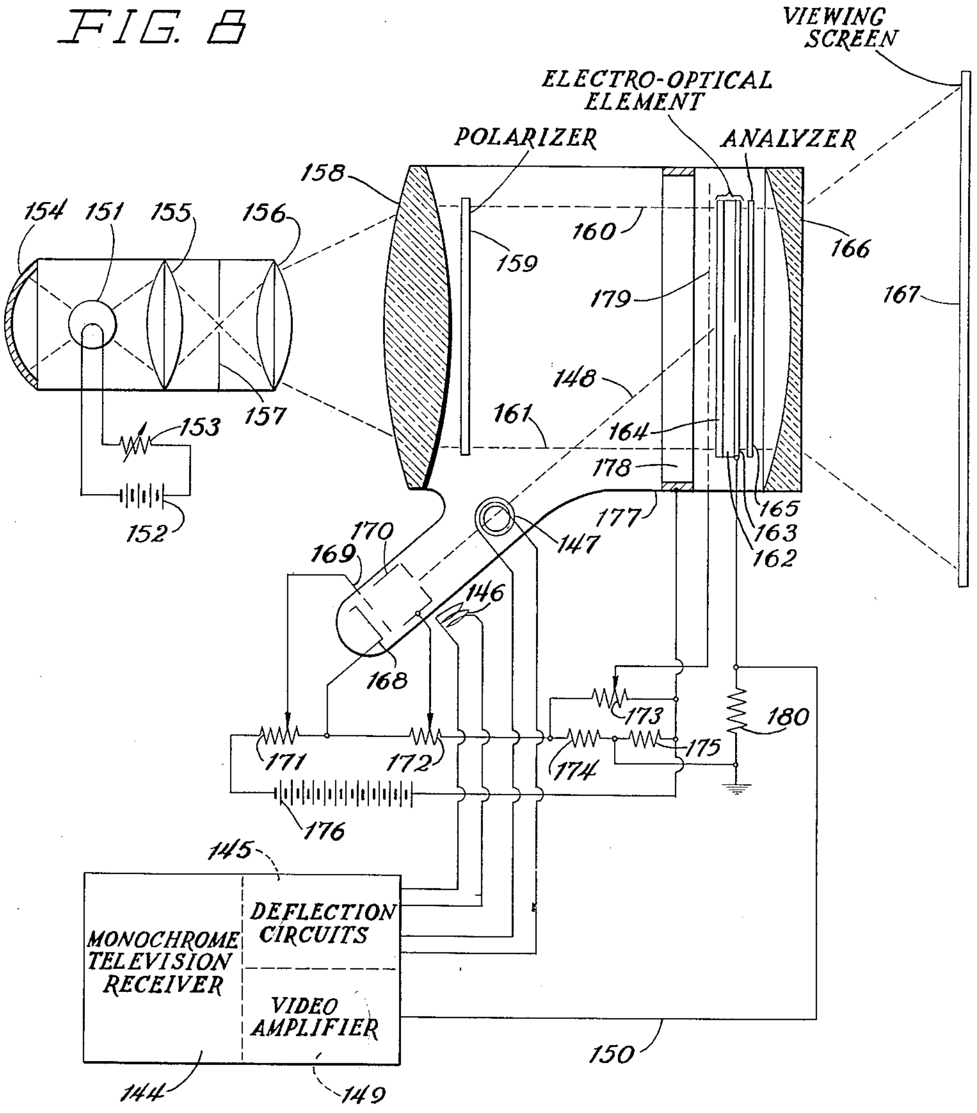
Fig. 8 is a schematic side elevation and simplified circuit diagram of a projection type monochrome television receiver embodying principles of this invention.

Fig. 8 illustrates another embodiment of the invention, wherein no separate erasing beam is provided, but where new images are provided by writing over a previous image. This embodiment is especially useful in a monochrome television receiver, since the viewing screen is always illuminated and objectionable flicker is substantially eliminated. Referring now to Fig. 8, a projection-type television picture tube embodying principles of the present invention is shown connected in the circuit of a conventional monochrome television receiver. In the drawing, conventional television receiver circuits are represented by box 144, and these circuits include the customary deflection circuits 145, including conventional keystone correction circuits, which supply saw-tooth waveform scanning currents to the magnetic deflection coils 146 and 147, so that electron beam 148 is repetitively deflected over a conventional television scanning raster. The receiver circuits also include a conventional video amplifier 149 which supplies through lead 150 electric signals representing instantaneous brightness values of the transmitted picture.

A lamp 151 operated from a suitable electric power supply, indicated in the drawing by battery 152, is connected in series with a variable resistor or rheostat 153 so that the brightness of the lamp can be adjusted. This adjustment provides a convenient means for adjusting the over-all brightness of the picture. In addition to the lamp 151, the light source may include a reflector 154, a pair of lenses 155 and 156, and a stop 157 having a small central aperture, arranged as shown. The light source provides a beam of light which is collimated by a lens 158 and is plane polarized by a disc of Polaroid material, or other polarizer, 159. The outer rays of the collimated beam are represented in the drawing, by broken lines 160 and 161.

An electro-optical element consists of an electro-optical crystal 162 sandwiched between two transparent electrodes 163 and 164. Electrode 163 is a high-conductivity electrode, preferably a thin metallic film, and electrode 164 is an insulating material, preferably a thin sheet of mica. The collimated light beam passes through the electro-optical element in a direction perpendicular to the electrodes and to the large faces of crystal 162, and through an analyzer 165 which may be another disc of Polaroid material. Any light emerging from analyzer 165 is directed by a projection lens 166 onto a viewing screen 167. Electrical images formed on electrode 164 by beam 148 produce optical images on viewing screen 167 in the manner hereinbefore explained. An advantageous feature of this projection system is that no focusing is required. A smaller and brighter image can be obtained by moving screen 167 closer to lens 166, or a larger image can be formed by moving screen 167 away from lens 166, and no focusing adjustment is required. When the image is made larger, it also becomes dimmer, but this can be compensated by adjusting rheostat 153 to increase the brightness of the lamp 151.

An electron gun consists of a cathode 168, a control grid 169 and one or more accelerating electrodes 170. Operating voltages for these electrodes are supplied by a voltage divider network comprising resistors 171, 172, 173, 174 and 175, connected as shown across a suitable voltage source represented in the drawing by battery 176. This electron gun provides an electron beam 148 which is focused to a point on electrode 164 and which is deflected over the surface of electrode 164 in a conventional television scanning raster by the deflection currents supplied to coils 146 and 147. Control grid 169 is connected to a tap of resistor 171, which may be adjusted to adjust the intensity of electron beam 148. Accelerating electrode 170 is connected to a tap on resistor 172, which may be adjusted to adjust the focus of the electron beam. In the usual manner, the electron gun and the electro-optical element are enclosed in an evacuated envelope 177. Lenses 158 and 166 may be sealed into respective ends of the envelope as shown, and the large cylindical portion of the envelope may advantageously be made of metal. The envelope neck containing the electron gun is preferably made of glass.

A cylindrical collector electrode 178, which may be a metallic part of envelope 177, is connected to the positive terminal of battery 176. A fine-mesh barrier grid 179 is parallel to and just behind electrode 164, and is connected to an adjustable tap on resistor 173. The back-plate electrode 163 is connected to video amplifier 149 through lead 150, and is also connected through a resistor 180 to the circuit junction between voltage divider resistors 174 and 175, so that the back-plate potential is negative with respect to the potential of collector electrode 178. By adjusting the tap on resistor 173, the potential of barrier grid 179 can be made equal to, slightly more positive than, or slightly more negative than the back-plate potential.

The potential of cathode 168 is sufficiently negative so that the electrons in beam 148 strike electrode 164 with sufficient velocity to produce substantial secondary emission. Consequently, the potential of a bombarded point of electrode 164 can be determined from curve 132 of Fig. 7, provided horizontal line 129 is now taken to represent the potential of barrier grid 179.

Assume for the moment that no signal is applied to electrode 163 through lead 150, and that the tap of resistor 173 is so adjusted that the potential of barrier grid 179 is equal to the potential of back-plate electrode 163. Also assume that the cathode potential is negative with respect to the barrier grid potential by the amount represented by Fig. 7 at point 134, which is the second crossover point of the secondary emission curve of electrode 164. Now when any point on electrode 164 is bombarded by electron beam 148, that point is driven to the equilibrium potential which, under the assumed conditions, is equal to the potential of grid 179 and is also equal to the potential of back-plate electrode 163, so that very little light is transmitted through the shutter at that point. If perchance the cathode potential is not at exactly the crossover value, the equilibrium potential of the bombarded points will be slightly positive or slightly negative with respect to the potential of barrier grid 179, but the equilibrium potential can still be made equal to the zero-signal potential of back-plate 163 by adjusting the tap on resistor 173 to shift the potential of grid 179 to a compensating value. When the bombarded spot reaches its equilibrium potential, the number of secondary electrons emitted is exactly equal to the number of primary electrons deposited by beam 148, and no further change of potential at the bombarded spot occurs. Most of the secondary electrons pass through barrier grid 179 and are then attracted to the more positive potential of collector electrode 178. In this way the secondary electrons are effectively removed from the area near the electrode 164, so that there is little tendency for a secondary electron to fall upon positively charged areas of electrode 164.

Now assume that video amplifier 149 supplies through lead 150 to back-plate electrode 163 a potential which varies in accordance with the desired image brightness at the point being scanned. Assume for example, that the signal supplied through lead 150 makes the instantaneous potential of electrode 163 negative with respect to the potential of grid 179. Beam 148 charges the bombarded point to a potential substantially equal to the potential of grid 179, so that a voltage is produced between electrodes 163 and 164 at the bombarded point. Consequently, light is transmitted through a corresponding point of analyzer 165 and is directed by lens 166 to a corresponding point of viewing screen 167. Now assume that beam 148 is directed to another part of electrode 164, and that the potential of back-plate electrode 163 changes in response to a change in the signal provided through lead 150. No change occurs in the voltage between electrodes 163 and 164 at the previously bombarded point, because electrode 164 is a good electrical insulator, and assuming that the leakage current through crystal 162 is negligible and that secondary electrons are prevented from returning to electrode 164 by the barrier grid 179, the charge at any point on electrode 164 can be changed only when that point is bombarded by electron beam 148. Consequently, the amount of light transmitted through each point of the shutter is a function of the back-plate potential at the instant when that point was last bombarded by beam 148. Whenever a previously charged spot is again bombarded by beam 148, the potential at that point again shifts to the equilibrium potential, and the voltage between electrode 163 and 164 at that point, and consequently the amount of charge left at that point, depends upon the new value of the back-plate potential. When electrode 164 is scanned repetitively, according to a conventional television scanning raster for example, each bombarded point transmits an amount of light determined by the video signal from amplifier 149 at the instant of bombardment, and continues to transmit the same amount of light throughout the duration of the scanning cycle until the same point is bombarded again. As a result, the brightness at any point of the optical image, formed on the viewing screen 167, changes only as required by changes in the picture content, and consequently there is very little objectionable flicker such as is present in conventional kinescopes where the brightness at any point decays during the scanning cycle in accordance with the the phosphor characteristics.

It will be understood that this invention is not limited to specific embodiments herein illustrated and described, and that the following claims are intended to cover all changes and modifications which do not depart from the true spirit and scope of the invention.

What is claimed is:

1. An electro-optical shutter comprising an electro-optical crystal, means directing a polarized light beam through said crystal, a pair of transparent electrodes positioned respectively adjacent to opposite faces of said crystal and in the path of said light beam, a polarized light analyzer positioned in the path of said light beam after it passes through said crystal so that the transmission of light through said analyzer is variable as a function of a voltage between said electrodes, one of said electrodes having a higher electrical resistance than the other, and means for providing a focused electron beam directed selectively to different points on said higher resistance electrode, whereby light is transmitted selectively through different areas of the shutter to form an optical image.

2. An electro-optical shutter comprising an electro-optical crystal, means directing a polarized light beam through said crystal, a low-conductivity transparent electrode adjacent to the crystal face through which said light beam enters said crystal, a high-conductivity transparent electrode adjacent to the crystal face through which said light beam leaves said crystal, a peripheral portion of said low conductivity electrode being electrically connected to said high conductivity electrode, a polarized light analyzer positioned in the path of said light beam after its passage through said crystal so that the transmission of light through said analyzer is variable as a function of a voltage between said electrodes, and means providing an electron beam directed successively to a plurality of points on said low conductivity electrode and depositing negative charges thereon, said charges gradually leaking off through the electrical connection to the periphery of said low-conductivity electrode, whereby light is transmitted selectively through different areas of the shutter to form an optical image.

3. An electro-optical point shutter comprising an electro-optical crystal sandwiched between a pair of transparent electrodes, one of said electrodes being a high-conductivity metallic film and the other of said electrodes being a low-conductivity metallic film, said low-conductivity film having a high-conductivity strip extending around its periphery, means directing an electron beam selectively to a plurality of points on said low-conductivity film and depositing electrical charges thereon to form an electrical image, said charges gradually leaking off through said low-conductivity film to said high-conductivity peripheral strip, means directing a collimated beam of polarized light through said crystal perpendicular to said electrodes, and a polarized light analyzer positioned in the path of said beam after its passage through said crystal, whereby an optical image is formed which corresponds to said electrical image.

4. In a color television receiver having circuit means providing red, green, and blue chromaticity value electric signals, having circuit means providing a brightness value electric signal, and having circuit means providing horizontal and vertical deflection electric signals, a color reproducer comprising means providing a beam of red light, an electro-optical area shutter controlling the amount of red light transmitted in accordance with the red chromaticity signal, means providing a beam of green light, an electro-optical area shutter controlling the amount of green light transmitted in accordance with the green chromaticity signal, means providing a beam of blue light, an electro-optical area shutter controlling the amount of blue light transmitted in accordance with the blue chromaticity signal, means combining said three beams into a single collimated beam of plane-polarized light having a variable color which depends upon the relative values of the three chromaticity signals, an electro-optical crystal sandwiched between two transparent electrodes, one of said electrodes having a higher electrical resistance than the other, said crystal and electrodes being positioned in the path of said variable-color light beam and perpendicular thereto, means providing an electron beam focused to a point on one of said electrodes, means responsive to said horizontal and vertical deflection signals for deflecting said electron beam successively to a plurality of points on said electrode in a television scanning pattern, said beam providing electric charges at such points, and means controlling the amount of charge deposited at each point by said beam in accordance with instantaneous values of the brightness signal, whereby a monochrome electric image is formed on one of said electrodes, and a polarized light analyzer positioned in the path of light transmitted through said crystal, whereby the light emerging from said analyzer forms a colored optical image.

5. A color reproducer as in claim 4, in which each of the electro-optical shutters comprises an electro-optical crystal sandwiched between two high-conductivity transparent electrodes.

6. An electro-optical shutter comprising an electro-optical crystal sandwiched between two transparent electrodes, one of said electrodes having a higher electrical resistance than the other, scanning means for establishing an electrical image on said higher electrically resistive electrode in a point by point fashion, means directing a collimated beam of plane-polarized light through said crystal, and a polarized light analyzer positioned in the path of said beam after its passage through said crystal, whereby light transmitted through said analyzer forms an optical image and means for flooding the higher electrically resistive electrode to restore an equilibrium status thereon following scanning.

7. An electro-optical point shutter comprising an electro-optical crystal sandwiched between two transparent electrodes, one of said electrodes being electrically conductive and the other of said electrodes being electrically insulating, means providing two electron beams having different electron velocities each bombarding said insulating electrode and producing different ratios of secondary emission therefrom, one of said electron beams being focused to substantially punctiform cross-section at the insulating electrode so as to tend to charge said insulating electrode to a potential which is positive relative to the potential of said conductive electrode and the other of said electron beams being defocused to substantially flood the insulating electrode thereby to restore the equilibrium potential of said insulating electrode, means deflecting one of said beams to a selected pattern of traverse to cause it to trace a plurality of points on said insulating electrode selectively to establish an electrical image thereon, means providing a collimated beam of plane-polarized light through said crystal perpendicular to said electrodes, and a polarized light analyzer positioned in the path of said beam after its passage through said crystal, whereby light transmitted through said analyzer forms an optical image corresponding to the electrical image on said insulating electrode.

8. An electro-optical point shutter comprising an electro-optical crystal sandwiched between two transparent electrodes, one of said electrodes being electrically conductive and the other of said electrodes being electrically insulating, means providing an electron beam focused to a point on said insulating electrode, said beam producing secondary emission from the bombarded point of said insulating electrode and charging such point to an equilibrium potential at which the number of secondary electrons leaving the bombarded point is equal to the number of primary electrons deposited at the bombarded point, means deflecting said electron beam to a plurality of points on said insulating electrode successively, and means for varying the potential of said conductive electrode relative to the equilibrium potential of said insulating electrode as successive points are bombarded by said electron beam, whereby a charge pattern corresponding to an electrical image is formed on said insulating electrode, means directing a collimated beam of plane-polarized light through said crystal perpendicular to said electrodes, and a polarized light analyzer positioned in the path of said beam after its passage through said crystal, whereby light transmitted through said analyzer forms an optical image corresponding to said electrical image.

9. An electro-optical point shutter comprising an electro-optical crystal sandwiched between two transparent electrodes, one of said electrodes being electrically conductive and the other of said electrodes being electrically insulating, means for bombarding said insulating electrode with electrons at two different electron velocities that produce different ratios of secondary emission therefrom and respectively tend to charge the insulating electrode to two different electric potentials, means for focusing the electrons of one velocity on said insulating electrode to form an electrical image thereon, means for diffusing the electrons of the other velocity over the surface of said insulating electrode for erasing said electrical image, means for providing a collimated beam of plane-polarized light through said crystal perpendicular to said electrodes, and a polarized light analyzer positioned in the path of said beam after its passage through said crystal, whereby light transmitted through said analyzer forms an optical image corresponding to the electrical image on said insulating electrode.

10. An electro-optical point shutter comprising an electro-optical crystal sandwiched between two transparent electrodes, one of said electrodes being electrically conductive and the other of said electrodes being electrically insulating, a collector electrode adjacent to said insulating electrode, means for maintaining said collector electrode at a positive electric potential relative to said conductive electrode, electron gun means having a cathode at a negative electric potential relative to said conductive electrode and operable to bombard selected portions of said insulating electrode with a focused electron beam that produces secondary emission with a ratio greater than one and charges said selected portions with positive polarity so that an electrical image is formed on said insulating electrode, electron gun means having a cathode at substantially the same electric potential as said conductive electrode and operable to bombard substantially the entire surface of said insulating electrode with a diffuse beam of electrons that erases said electrical image, means providing a collimated beam of plane-polarized light through said crystal perpendicular to said electrodes, and a polarized light analyzer positioned in the path of said light beam after it passes through said crystal, whereby light transmitted through said analyzer forms an optical image corresponding to the electrical image on said insulating electrode.

11. An electro-optical point shutter comprising an electro-optical crystal sandwiched between two transparent electrodes, one of said electrodes being electrically conductive and the other of said electrodes being electrically insulating, two electron guns operable to bombard said insulating electrode with two electron beams having different electron velocities, said insulating electrode having a secondary emission ratio greater than one with respect to one of said electron velocities and smaller than one with respect to the other so that one of said beams tends to make bombarded areas of the insulating electrode more positive while the other of said beams tends to make such areas more negative, means for focusing one of said beams on selected areas of said insulating electrode to form an electrical image thereon, the other of said beams being diffused over substantially the entire surface of said insulating electrode for erasing said electrical image, means operable to turn each of said electron beams on and off selectively independently of the other, means providing a collimated beam of plane-polarized light through said crystal perpendicular to said electrodes, and a polarized light analyzer positioned in the path of said light beam after its passage through said crystal, whereby light transmitted through said analyzer forms an optical image corresponding to the electrical image on said insulating electrode, the duration of the optical image being variable by varying the time interval between the turning on of the image-forming beam and the turning on of the image-erasing beam.

12. An electro-optical shutter comprising an electro-optical crystal, means for directing a light beam through said crystal, light polarizer and light analyzer means positioned in the path of the light beam, a pair of transparent electrodes positioned respectively adjacent to opposite faces of said crystal and in the path of said light beam, one of said electrodes having a higher electrical resistance than the other, means to apply a voltage between the electrodes so that the transmission of light through the crystal is variable as a function of the voltage between the electrodes, and means providing a focused electron beam directed selectively to different areas of the shutter to form an optical image.

13. An electro-optical shutter comprising an electro-optical crystal, means for directing a polarized light beam along a path leading through said crystal, a polarized light analyzer also positioned in said path, a low-conductivity transparent electrode adjacent to the crystal face through which said light beam enters said crystal, a high-conductivity transparent electrode adjacent to the crystal face through which light leaves said crystal, a peripheral portion of said low-conductivity electrode being electrically connected to said high-conductivity electrode, means for applying a voltage to said electrodes, means providing a light beam, an electro-optical point shutter transmitting light from said beam through a plurality of shutter areas successively, means for varying the color of said beam as light is transmitted through successive shutter areas to form a colored optical image, and means providing an electron beam directed successively to a plurality of points on said low-conductivity electrode and depositing negative charges thereon, said charges gradually leaking off through the electrical connection to the periphery of said low-conductivity electrode, whereby light is transmitted selectively through different areas of the shutter to form an optical image.

References Cited in the file of this patent

UNITED STATES PATENTS

| | | |
|---|---|---|
| 2,147,760 | Vance et al. | Feb. 21, 1939 |
| 2,259,507 | Iams | Oct. 21, 1941 |
| 2,276,360 | Von Ardenne | Mar. 17, 1942 |
| 2,277,008 | Von Ardenne | Mar. 17, 1942 |
| 2,277,009 | Von Ardenne | Mar. 17, 1942 |
| 2,330,171 | Rosenthal | Sept. 21, 1943 |
| 2,481,622 | Rosenthal | Sept. 13, 1949 |
| 2,616,962 | Jaffe | Nov. 4, 1952 |
| 2,667,596 | Szeghs et al. | Jan. 26, 1954 |
| 2,705,903 | Marshall | Apr. 12, 1955 |
| 2,766,659 | Baerwald | Oct. 16, 1956 |